United States Patent
Rana

(10) Patent No.: US 11,764,673 B2
(45) Date of Patent: Sep. 19, 2023

(54) NMOS-BASED NEGATIVE CHARGE PUMP CIRCUIT

(71) Applicant: STMicroelectronics International N.V., Geneva (CH)

(72) Inventor: Vikas Rana, Noida (IN)

(73) Assignee: STMicroelectronics International N.V., Geneva (CH)

(\*) Notice: Subject to any disclaimer, the term of this patent is extended or adjusted under 35 U.S.C. 154(b) by 0 days.

(21) Appl. No.: 17/673,033

(22) Filed: Feb. 16, 2022

(65) Prior Publication Data

US 2022/0286048 A1 Sep. 8, 2022

Related U.S. Application Data

(60) Provisional application No. 63/156,000, filed on Mar. 3, 2021.

(51) Int. Cl.
*H02M 3/07* (2006.01)

(52) U.S. Cl.
CPC .................. *H02M 3/071* (2021.05)

(58) Field of Classification Search
None
See application file for complete search history.

(56) References Cited

U.S. PATENT DOCUMENTS

| | | | | |
|---|---|---|---|---|
| 5,734,286 A * | 3/1998 | Takeyama | .......... | H03K 5/15013 327/295 |
| 5,751,142 A * | 5/1998 | Dosho | ..................... | G05F 3/247 323/901 |
| 5,973,979 A * | 10/1999 | Chang | .................... | G11C 16/30 365/185.33 |
| 6,130,572 A * | 10/2000 | Ghilardelli | ............ | H02M 3/073 327/536 |
| 6,452,438 B1 * | 9/2002 | Li | .......................... | H02M 3/073 327/536 |
| 6,952,129 B2 * | 10/2005 | Lin | ........................ | H02M 3/073 363/60 |
| 7,123,077 B2 * | 10/2006 | Chiu | ..................... | H02M 3/073 363/60 |
| 10,250,133 B2 | 4/2019 | Rana | | |
| 10,333,397 B2 | 6/2019 | Rana et al. | | |
| 10,461,636 B2 * | 10/2019 | Rana | ...................... | H02M 3/07 |
| 10,811,960 B2 | 10/2020 | Rana | | |
| 10,910,945 B2 * | 2/2021 | Coustans | ............... | G11C 5/145 |
| 2020/0412241 A1 | 12/2020 | Rana | | |

\* cited by examiner

*Primary Examiner* — Thomas J. Hiltunen
(74) *Attorney, Agent, or Firm* — CROWE & DUNLEVY

(57) ABSTRACT

A charge pump circuit includes a boost capacitor driven by a first clock signal and a bootstrap capacitor driven by a second clock signal. The first and second clock signals have different duty cycles, with the duty cycle of the second clock signal being smaller than the duty cycle of the first clock signal. An input transistor is coupled between an input node and a boost node coupled to the boost capacitor. The control terminal of the input transistor is coupled to the bootstrap capacitor. A bootstrap transistor coupled between the boost node and the control terminal of the input transistor is driven by a logical inverse of the first clock signal.

31 Claims, 6 Drawing Sheets

US 11,764,673 B2

NMOS-BASED NEGATIVE CHARGE PUMP CIRCUIT

CROSS-REFERENCE TO RELATED APPLICATIONS

This application claims priority to U.S. Provisional Application for Patent No. 63/156,000, filed Mar. 3, 2021, the disclosure of which is incorporated by reference.

TECHNICAL FIELD

The present invention relates to a charge pump circuit and, in particular, to a charge pump circuit configured to generate a negative output voltage.

BACKGROUND

A voltage charge pump is a DC-DC voltage converter that operates to convert an input voltage to an output voltage having a magnitude that is higher than the input voltage. The input is, in many instances, a supply voltage for a circuit. Such charge pump circuits typically use capacitors as energy storage devices. The capacitors are switched in such a way that the desired voltage conversion occurs. Circuits for both positive voltage generation and negative voltage generation are known in the art.

Charge pumps are useful in many different types of circuits, including low-voltage circuits, dynamic random access memory circuits, switched-capacitor circuits, EEPROM's and transceivers. In non-volatile memories, for example, charge-pumps are critical because they are used to generate the high voltages (positive and/or negative) necessary to perform program and erase operations.

An example of a prior art negative voltage charge pump circuit 10 stage is shown in FIG. 1. This circuit 10 uses complementary metal oxide semiconductor (CMOS) technology to form a latch circuit including two cross-coupled CMOS inverter circuits 12 and 14. The source terminals of the p-channel MOS transistors of each latch circuit are connected to an input node A (receiving the input voltage VIN) and the source terminals of the n-channel MOS transistors of each latch circuit are connected to an output node B (generating the output voltage VOUT, where VOUT is a more negative voltage than the input voltage). A capacitor C is coupled to each pair of connected drain terminals of the CMOS transistors of the latch circuit. A first capacitor C coupled to inverter circuit 12 is configured to receive a clock signal ck and a second capacitor C coupled to inverter circuit 14 is configured to receive a clock signal ckn (which is a logical inversion of the clock signal ck). Operation of this circuit 10 in response to the clock signals ck and ckn to receive a ground voltage Gnd at node A and output a negative voltage of approximately −Vdd (where Vdd is the supply voltage for the inverter circuits 12 and 14) is well known to those skilled in the art. The p-channel MOS transistors of each latch circuit work in body effect (with a positive bias voltage applied to the transistor bodies by diode circuit 18).

To generate a higher magnitude negative voltage, a plurality of the charge pump circuit 10(1)-10(2) stages can be coupled in series as shown in FIG. 2. However, with each successive stage added to generate a higher negative voltage, the p-channel MOS transistors of that stage become weaker and voltage conversion efficiency reduces. Additionally, there is an increase in the bulk (body) to source/drain voltage in the downstream stages which can result in breakdown for relatively higher negative voltages.

An example of another prior art negative voltage charge pump circuit 20 is shown in FIG. 3. This circuit 20, referred to in the art as a Dickson charge pump, is based on the use of diodes (formed here using diode-connected n-channel MOS transistors 22) connected in series with a plurality of stages 24(1)-24(4) between the input voltage VIN node and the output voltage VOUT node and capacitors C connected to each stage 24 of the circuit 20 and driven with a clock signal. More specifically, a two-phase clock is used (ck and ckn, where ckn is the logical inversion of ck), with the clock ck applied to odd stages 24(1), 24(3) and the clock ckn applied to even stages 24(2), 24(4). A problem with the charge pump circuit is that there is a voltage drop in each stage 24 (due to the diode configuration), and so the voltage efficiency is poor; with an output voltage:

VOUT=−N(Vdd−Vth), where N is the number of stages 24 and Vth is the threshold voltage drop across each diode.

An example of another prior art negative voltage charge pump circuit 30 is shown in FIG. 4. This circuit 30 implements a boot-strapping with a plurality of clock signals. More specifically, four phase non-overlapped clock signals (ck1, ck2, ck3, ck4) are applied to a series connection of charge pump stages 32(1)-32(3). Each stage 32 includes two n-channel MOS transistors M1, M2 and two capacitors C1, C2. The first n-channel MOS transistor has its source-drain path coupled between the stage input and output nodes. The second n-channel MOS transistor has its source-drain path coupled between the output node and the gate of the first n-channel MOS transistor. The first capacitor C1 has one terminal coupled to the output node of the stage and a second terminal configured to receive a phase of the clock signal. The second capacitor C2 has one terminal coupled to the gate of the first n-channel MOS transistor M1 and a second terminal configured to receive another phase of the clock signal. For the first stage 32(1) of the circuit 30, the gate of the second n-channel MOS transistor M2 is coupled to receive a further phase of the clock signal. In all other stages 32, the gate of the second n-channel MOS transistor M2 is coupled to the stage output node of the preceding stage.

The clock signal includes four phases. The gate of the second n-channel MOS transistor M2 in the first stage 32(1) receives the second phase clock ck2. In odd stages 32(1), 32(3), the first phase clock ck1 is applied to the first capacitor C1 and the third phase clock C3 is applied to the second capacitor C2. Conversely, in the even stages 32(2), the fourth phase clock ck4 is applied to the first capacitor C1 and the second phase clock C2 is applied to the second capacitor C2.

Compared to the circuit 20 of FIG. 3, the circuit 30 of FIG. 4 provides for improved voltage efficiency. However, output impedance of the circuit 30 is high, and this imposes limitations on output current driving capability. This is due to the fact that only one voltage boost can be provided with respect to each cycle of the four phase clock. An additional drawback of this circuit 30 is that the use of a four phase clock imposes a restriction of using a high clock frequency.

There is accordingly a need in the art for a negative charge pump circuit that address the issues, concerns, and limitations of prior art negative charge pump circuits like those shown in FIGS. 1-4.

SUMMARY

In an embodiment, a circuit comprises: a first transistor having a source-drain path coupled between an input node and a first node, said input node configured to receive a first voltage; a second transistor having a source-drain path coupled between the first node and an output node, said output node configured to generate a second voltage that is more negative than the first voltage; a third transistor having a source-drain path coupled between the first node and a first control terminal of the first transistor; a first boost capacitor having a first plate coupled to the first node and a second plate coupled to receive a first clock signal; wherein a logical inversion of the first clock signal is applied to a third control terminal of the third transistor; a first bootstrap capacitor having a first plate coupled to the first control terminal and a second plate coupled to receive a second clock signal; and wherein the first and second clock signals have a same frequency but different duty cycles.

In an embodiment, a circuit, comprising: a first input transistor having a source-drain path coupled between an input node and a first node, said input node configured to receive a first voltage; a second input transistor having a source-drain path coupled between the input node and a second node; a first boost capacitor having a first plate coupled to the first node and a second plate coupled to receive a first clock signal; a first bootstrapping circuit coupled between the first node and a first control terminal of the first input transistor, said first bootstrapping circuit controlled by a logical inversion of the first clock signal and a second clock signal, wherein the first and second clock signals have a same frequency but different duty cycles; a second boost capacitor having a first plate coupled to the second node and a second plate coupled to receive a third clock signal; and a second bootstrapping circuit coupled between the second node and a second control terminal of the second input transistor, said second bootstrapping circuit controlled by a logical inversion of the third clock signal and a fourth clock signal, wherein the third and fourth clock signals have a same frequency but different duty cycles.

In an embodiment, a circuit comprises: a boost capacitor driven by a first clock signal and coupled to a boost node; a bootstrap capacitor driven by a second clock signal and coupled to an intermediate node; wherein the first and second clock signals have different duty cycles, with the duty cycle of the second clock signal being smaller than the duty cycle of the first clock signal; an input transistor coupled between an input node and the boost node, wherein a control terminal of the input transistor is coupled to the intermediate node; and a bootstrap transistor coupled between the boost node and the control terminal of the input transistor, wherein a control terminal of the bootstrap transistor is driven by a logical inverse of the first clock signal.

BRIEF DESCRIPTION OF THE DRAWINGS

For a better understanding of the embodiments, reference will now be made by way of example only to the accompanying figures in which.

DETAILED DESCRIPTION

Figure 5:
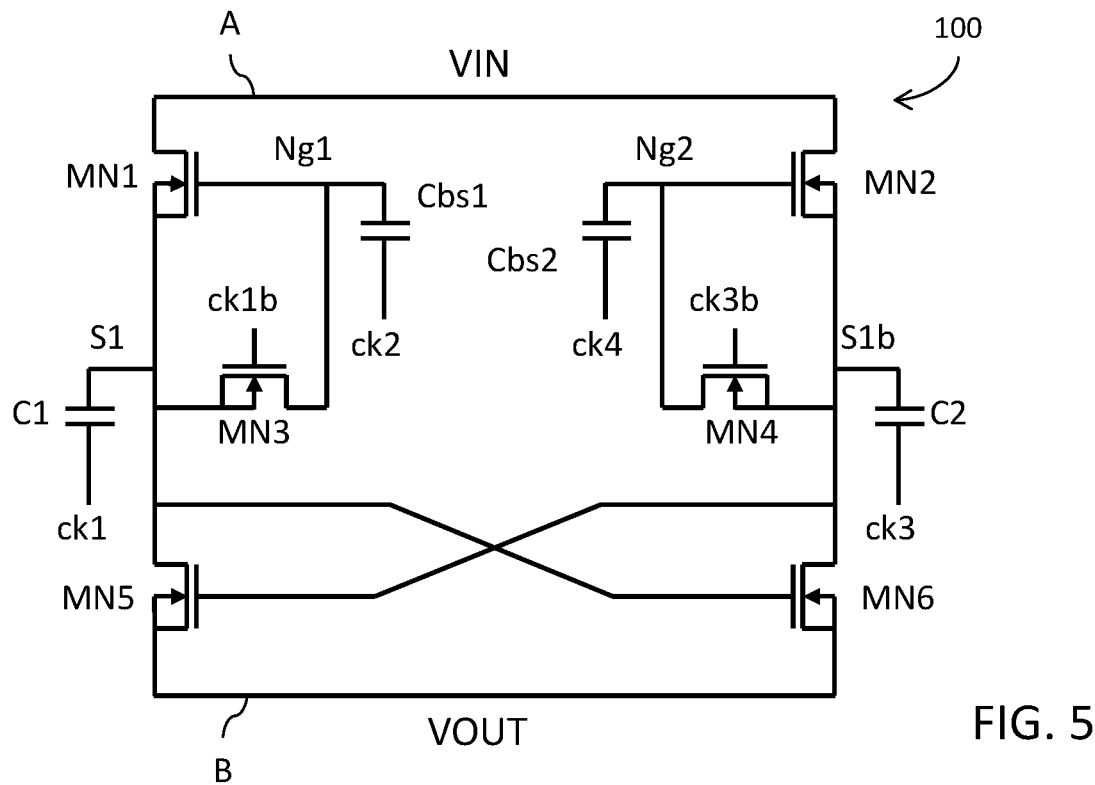
FIG. 5 is a circuit diagram of a negative voltage charge pump circuit.

Reference is now made to FIG. 5 showing a circuit diagram for a negative voltage charge pump circuit stage 100. The circuit stage 100 includes an n-channel MOS transistor MN1 having a drain terminal coupled, preferably directly connected, to an input node A and a source terminal coupled, preferably directly connected, to a node S1 (i.e., the source-drain path of the transistor is coupled between node A and node S1). The stage 100 further includes an n-channel MOS transistor MN2 having a drain terminal coupled, preferably directly connected, to the input node A and a source terminal coupled, preferably directly connected, to a node S1b (i.e., the source-drain path of the transistor is coupled between node A and node S1b). The node A is configured to receive an input voltage VIN from which a more negative output voltage VOUT is generated.

Figure 6:
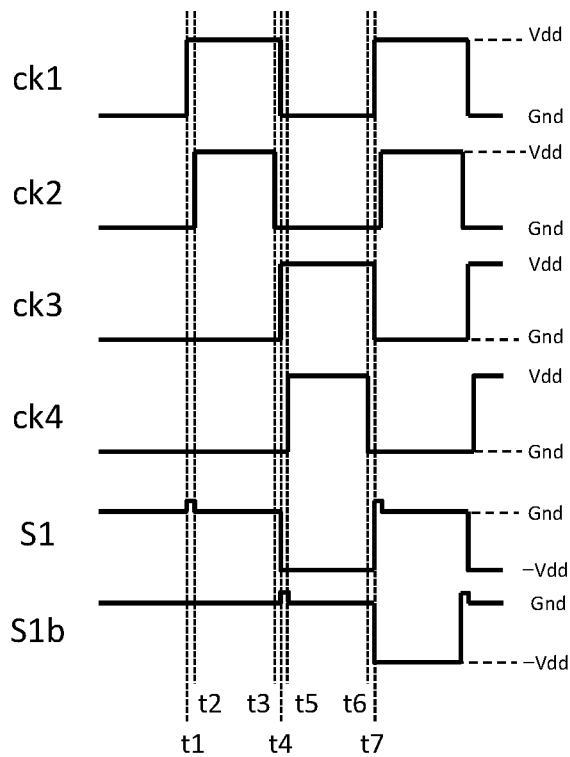
FIG. 6 is a timing diagram for clock phase signals and other node signals used to drive the negative voltage charge pump circuit of FIG. 5.

A first boost capacitor C1 has one terminal coupled, preferably directly connected, to node S1 and another terminal configured to receive a clock phase signal ck1. A second boost capacitor C2 has one terminal coupled, preferably directly connected, to node S1b and another terminal configured to receive a clock phase signal ck3 (which is a logical inversion of the clock phase signal ck1). The voltage waveforms for the clock phase signals ck1 and ck3 are shown in FIG. 6.

The stage 100 further includes an n-channel MOS transistor MN3 having a source terminal coupled, preferably directly connected, to node S1 and a drain terminal coupled, preferably directly connected, to the gate of transistor MN1 at node Ng1 (i.e., the source-drain path of the transistor is coupled between node S1 and node Ng1). The gate of transistor MN3 is configured to receive a logical inverse (ck1b) of the clock phase signal ck1. The stage 100 further includes an n-channel MOS transistor MN4 having a source terminal coupled, preferably directly connected, to node S1b and a drain terminal coupled, preferably directly connected, to the gate of transistor MN2 at node Ng2 (i.e., the source-drain path of the transistor is coupled between node S1b and node Ng2). The gate of transistor MN4 is configured to receive a logical inverse (ck3b) of the clock phase signal ck3.

A first bootstrap capacitor Cbs1 has one terminal coupled, preferably directly connected, to node Ng1 and another terminal configured to receive a clock phase signal ck2. A second bootstrap capacitor Cbs2 has one terminal coupled, preferably directly connected, to node Ng2 and another terminal configured to receive a clock phase signal ck4. The voltage waveforms for the clock phase signals ck2 and ck4 are shown in FIG. 6.

The clock signals ck1 and ck2 have a same frequency, but have different duty cycles, where the duty cycle of clock phase signal ck1 is larger than the duty cycle of clock phase signal ck2 (and the clock phase signal ck2 should be exactly enclosed inside the clock phase signal ck1). The clock signals ck3 and ck4 have a same frequency, but have different duty cycles, where the duty cycle of clock phase signal ck3 is larger than the duty cycle of clock phase signal ck4 (and the clock phase signal ck4 should be exactly enclosed inside the clock phase signal ck2; i.e., the timing of the pulse of ck4 is within the timing of the pulse of ck2). In this configuration, the clock phase signals ck1 and ck3 are 180 degrees out of phase with each other. Furthermore, the clock phase signals ck1 and ck4 are non-overlapping. Additionally, the clock phase signals ck2 and ck3 are non-overlapping.

The stage 100 still further includes an n-channel MOS transistor MN5 having a source terminal coupled, preferably directly connected, to an output node B and a drain terminal coupled, preferably directly connected, to node S1 (i.e., the source-drain path of the transistor is coupled between node B and S1) and an n-channel MOS transistor MN6 having a source terminal coupled, preferably directly connected, to the node B and a drain terminal coupled, preferably directly connected, to node S1$b$. The transistors MN5 and MN6 are cross-coupled with the gate terminal of transistor MN5 coupled, preferably directly connected, to the drain terminal of transistor MN6 at node S1$b$ and the gate terminal of transistor MN6 coupled, preferably directly connected, to the drain terminal of transistor MN5 at node S1. The node B is configured to generate an output voltage VOUT that is more negative than the input voltage VIN. In an example implementation where the input voltage is 0V (Gnd), the output voltage would ideally be equal to−Vdd (where Vdd is logic high voltage for the clock phase signals ck1, ck2, ck3 and ck4). In a practical implementation, however, there are voltage offsets from the ideal voltage due to the effects of a voltage drop (Vpar) caused by parasitic capacitances of switch and routing load as well as due to the load current and frequency of the clock phase signals.

The transistors MN1 and MN2 are alternately actuated input transistors. The transistor MN3 and capacitor Cbs1 form a first bootstrapping circuit. The transistor MN4 and capacitor Cbs2 form a second bootstrapping circuit. The capacitors C1 and C2 are the boosting capacitors. The transistors MN1 and MN2 are alternately actuated output transistors.

Operation of the stage 100 is as follows.

To begin with, assume that all nodes are grounded.

1) Once the clock phase signals are applied to the circuit, clock phase signal ck1 transitions from 0→1 at time t1. Here, logic "0" is referred to ground and logic "1" is referred to the supply voltage Vdd. In response to the transition from 0→1 of clock phase signal ck1, due to coupling effect across capacitor C1, node S1 at the upper plate of capacitor C1 will try to move from ground to the Vdd voltage level. However, node S1 will not be able to reach the Vdd voltage level because the bulk-drain junction of transistor MN1 will be forward biased. This is because the source of transistor MN1 is connected to its bulk and the drain is connected to the input voltage VIN which is at the ground (Gnd) voltage level. So, node S1 will reach up to threshold voltage of the bulk to drain junction. The gate control signal ck1$b$, which is the logical inversion of the clock phase signal ck1, will simultaneously transition from 1→0, and this will keep transistor MN3 in the OFF condition.

2) In the next step, the clock phase signal ck2 transitions from logic 0→1 at time t2. Due to coupling effect across bootstrap capacitor Cbs1, the voltage at node Ng1 will go to the positive Vdd voltage level. As node Ng1 transitions to the Vdd voltage level, it will cause the transistor MN1 to switch ON (because its gate has reached to a positive voltage). With transistor MN1 in the ON state, the voltage at node S1 will be discharged to the ground voltage level at the input VIN. Thus, the voltage at the node S1 will settle to the GND voltage level.

3) At time t3, the clock phase signal ck2 transitions from 1→0. During this transition, the coupling effect across bootstrap capacitor Cbs1 will again have an impact and it will bring the voltage at node Ng1 from the Vdd voltage level to the ground voltage level. As Ng1 will be grounded (due to coupling effect), it will again control transistor MN1 in the OFF state.

4) Next, at time t4, clock phase signal ck1 transitions from 1→0. The gate control signal ck1$b$, which is the logical inversion of the clock phase signal ck1, will simultaneously transition from 0→1. As gate of transistor MN3 is now at the Vdd voltage level, it will switch the transistor MN3 to the ON state and connect node S1 to node Ng1. Due to transition of the clock phase signal ck1 from 1→0, node S1 will transition to the −Vdd voltage level (as previously it was at the ground voltage level). This negative voltage boosting occurs due to the coupling effect across capacitor C1. As the node S1 reaches to the −Vdd voltage level, so too does node Ng1 also reach the −Vdd voltage level via transistor MN3 which is still in the turned ON state. As node Ng1 is at the −Vdd voltage level, it will keep transistor MN1 switched in the OFF state and charge at node S1 will not leak from node S1 towards the input voltage VIN node. In this way, node S1 will toggle between the ground voltage level and the −Vdd voltage level during different clock transitions. Similarly, node S2$b$ will toggle between the −Vdd voltage level and the ground voltage level (but in opposite phase of node S1) due to different transition of clock phase signals ck3 and ck4.

5) Also at time t4, with node S1 at the −Vdd voltage level, node S1$b$ is at the ground voltage level. This will cause transistor MN5 to switch to the ON state and pass the −Vdd voltage level at node S1 to the output node VOUT. As node S1 is at the −Vdd voltage level it will keep transistor MN6 in the OFF state so that charge stored at node vout will not leaked toward node S1$b$.

6) Similarly, when node S1$b$ is at the −Vdd voltage level, node S1 will be at the ground voltage level. This voltage level will cause transistor MN6 to turn ON and will keep transistor MN5 switched in the OFF state. As transistor MN6 is switched ON it will pass the −Vdd voltage level from node S1$b$ to the output node VOUT. See, time t7.

7) In this way, during the half clock cycles (ck1 and ck2), the −Vdd voltage level will be passed on to the output node VOUT via turning ON transistor MN5. Likewise, during second half clock cycles (ck3 and ck4), the −Vdd voltage level will be passed on to the output node VOUT via turning ON transistor MN6.

The foregoing explains operation of the left half side of circuit 100. By virtue of modularity in architecture, the same explanation is valid for right half side with respect to time t4, t5, t6 and t7.

Figure 7:
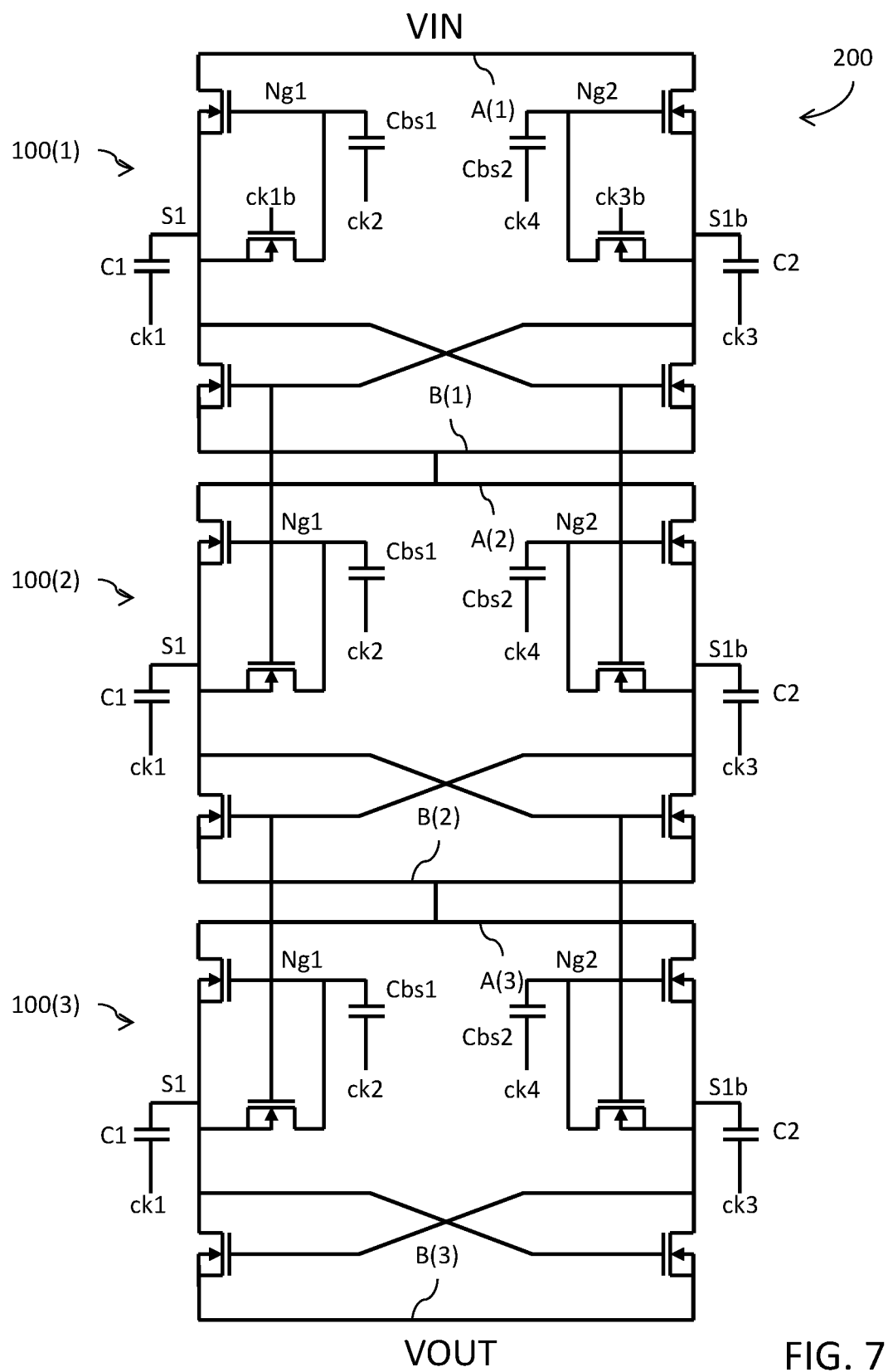
FIG. 7 is a circuit diagram of a charge pump circuit using cascaded stages as shown in FIG. 5.

To generate a higher magnitude negative voltage, a plurality of the charge pump circuit stages 100(1)-100(3) can be coupled in series as shown in FIG. 7. Node B of one circuit stage 100 is coupled, preferably directly connected, to node A of the subsequent circuit stage 100. It will be noted that the transistors MN3 and MN4 in the first circuit stage 100(1) are gate driven by the logical inverted clock signals ck1$b$ and ck3$b$. However, in the second and subsequent stages 100(2)-100(3), the transistors MN3 and MN4 are gate driven by the signals at nodes S1$b$ and S1, respectively, from the previous circuit stage 100. The reason for this is that source connection of transistors MN3 and MN4 is to nodes S1 and S1b, respectively. In the first stage 100(1), nodes S1 and S1b toggle between the ground voltage and the −Vdd voltage. In subsequent stages 100(2) and 100(3), however, the nodes S1 and S1b toggle between the −Vdd voltage and the −2Vdd voltage and between the −2Vdd voltage and the −3Vdd voltage, respectively. For these subsequent stages 100(2) and 100(3), the transistors MN3 and MN4 must be gate driven to ensure turn OFF by voltages dependent on the voltage levels at the source. The logical inverted clock signals ck1b and ck3b, toggling between the logic 0 (ground) and logic 1 (Vdd) voltages, cannot be used. Instead, the voltages from the S1 and S1b nodes of the previous stage are used, these voltages being well suited to switch ON/OFF the transistors MN3/MN4 of the next stage. As an additional benefit, this gate drive connection for subsequent stages also helps in operating the transistors within Safe Operating Area (SOA) limits.

The output voltage VOUT of a charge pump circuit formed by the series coupling of N charge pump circuit stages 100(1)-100(N), as generally shown in FIG. 7 where N=3, is given by:

$$VOUT=-(N*Vdd)+Vpar+(N/fc)Iload;$$

wherein N is the number of cascaded stages, Vdd is the logic high voltage for the clock signals; Vpar is the voltage drop across parasitic capacitances due to switch and routing load; fc is the frequency of the clock signals, and Iload is the load current driving a load circuit (not shown) connected to node B(N) of the N-th stage 100(N) in the charge pump circuit.

Figure 8:
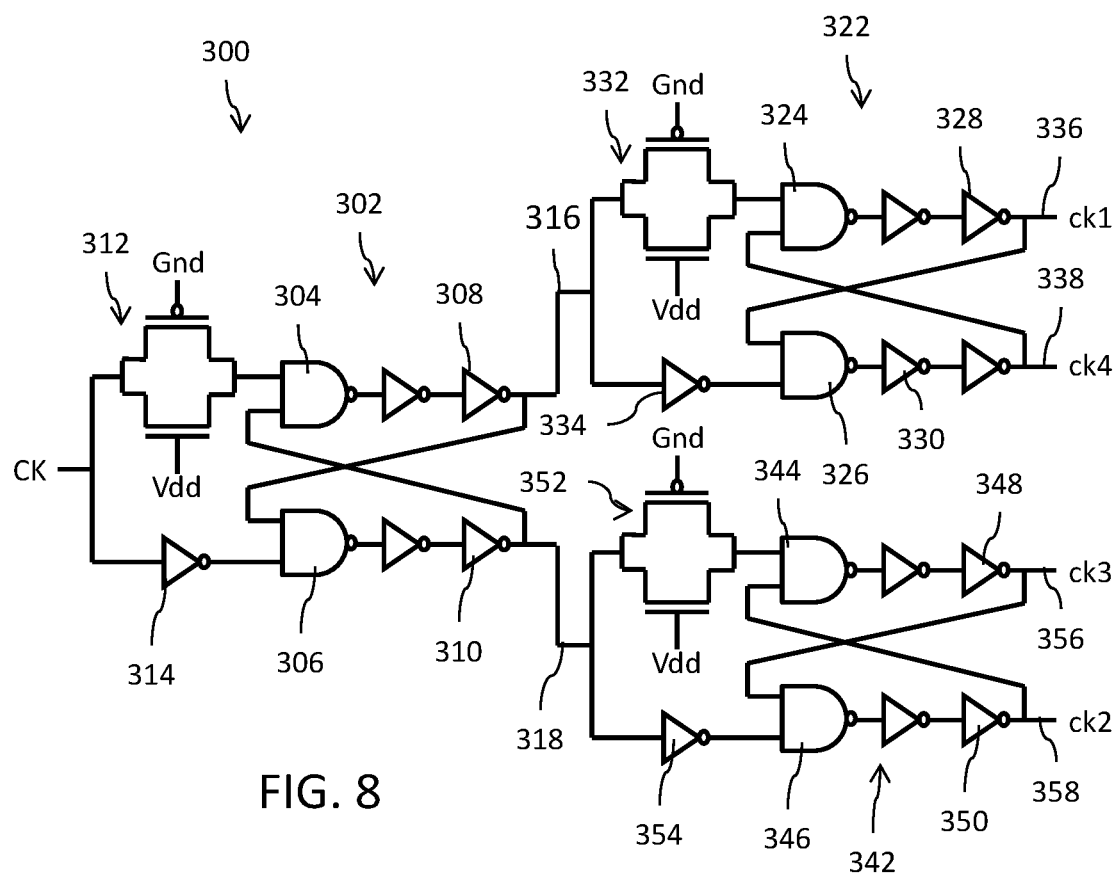
FIG. 8 is a logic diagram for a circuit that generates clock phase signals for driving the negative voltage charge pump circuit of FIG. 5.

Reference is now made to FIG. 8 which shows a logic diagram for a circuit 300 that generates clock phase signals ck1, ck2, ck3 and ck4 for driving the negative voltage charge pump circuit of FIG. 5. The clock phase signals ck1, ck2, ck3 and ck4 are generated by the circuit 300 from a master clock signal CK. The circuit 300 includes a first NAND latch circuit 302 (also known as a set-reset latch) formed by a pair of NAND gates 304 and 306 in a cross coupled configuration where the output of gate 304, delayed by logic inverters 308, is applied to the input of the gate 306, and where the output of gate 306, delayed by logic inverters 310, is applied to the input of the gate 304. The master clock CK is passed through a transmission gate circuit 312 to the gate 304 and logically inverted by an inverter circuit 314 for application to the gate 306. The transmission gate circuit 312 is formed by parallel connected n-channel and p-channel MOS transistors, where the p-channel transistor has a gate coupled, preferably directly connected, to ground Gnd, and the n-channel transistor has a gate coupled, preferably directly connected, to the supply voltage Vdd. The clock signals generated at the output nodes 316 and 318 of the first NAND latch circuit 302 have a same frequency but are non-overlapping logical inversions of each other.

The circuit 300 includes a second NAND latch circuit 322 (also known as a set-reset latch) formed by a pair of NAND gates 324 and 326 in a cross coupled configuration where the output of gate 324, delayed by logic inverters 328, is applied to the input of the gate 326, and where the output of gate 326, delayed by logic inverters 330, is applied to the input of the gate 324. The clock signal at node 316 is passed through a transmission gate circuit 332 to the gate 324 and logically inverted by an inverter circuit 334 for application to the gate 326. The transmission gate circuit 332 is formed by parallel connected n-channel and p-channel MOS transistors, where the p-channel transistor has a gate coupled, preferably directly connected, to ground Gnd, and the n-channel transistor has a gate coupled, preferably directly connected, to the supply voltage Vdd. The transmission gate circuit 332 is used to match the clock path. The clock signals ck1 and ck4 are generated at the output nodes 336 and 338 of the second NAND latch circuit 322 have a same frequency but are non-overlapping logical inversions of each other.

The circuit 300 further includes a third NAND latch circuit 342 (also known as a set-reset latch) formed by a pair of NAND gates 344 and 346 in a cross coupled configuration where the output of gate 344, delayed by logic inverters 348, is applied to the input of the gate 346, and where the output of gate 346, delayed by logic inverters 350, is applied to the input of the gate 344. The clock signal at node 318 is passed through a transmission gate circuit 352 to the gate 344 and logically inverted by an inverter circuit 354 for application to the gate 346. The transmission gate circuit 352 is formed by parallel connected n-channel and p-channel MOS transistors, where the p-channel transistor has a gate coupled, preferably directly connected, to ground Gnd, and the n-channel transistor has a gate coupled, preferably directly connected, to the supply voltage Vdd. The transmission gate circuit 352 is used to match the clock path. The clock signals ck3 and ck2 are generated at the output nodes 356 and 358 of the third NAND latch circuit 342 have a same frequency but are non-overlapping logical inversions of each other.

The transmission gate circuits 312, 332, 352 are used to match clock paths. It will be noted from a review of FIG. 6 that some very specific timing constraints must be met: a) the clock phase signal ck2 should be exactly enclosed inside the clock phase signal ck1; b) the clock phase signal ck4 should be exactly enclosed inside the clock phase signal ck3; and c) the clock phase signals ck1 and ck3 should be exactly opposite in phase. To meet these constraints, there is a need to meet the timing path during generation of clock signals. With reference to FIG. 8, in the generation of the clock phase signals ck1 to ck4, for the circuits used to generate the clock phase signals ck4 and ck2 there is an extra inverter in the signal generation path which will provide an extra delay. In order to meet and match the delay of this extra inverter, the transmission gate circuit 312 is provided in the signal path for the clock phase signals ck1 and ck3.

Figure 1:
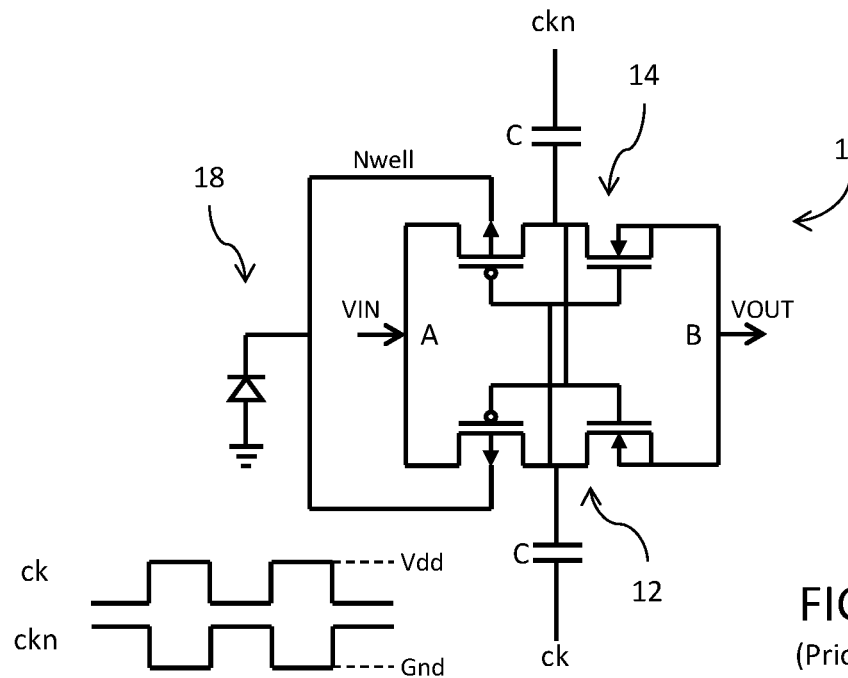
FIG. 1 is a circuit diagram of a prior art negative voltage charge pump circuit stage.
Figure 2:
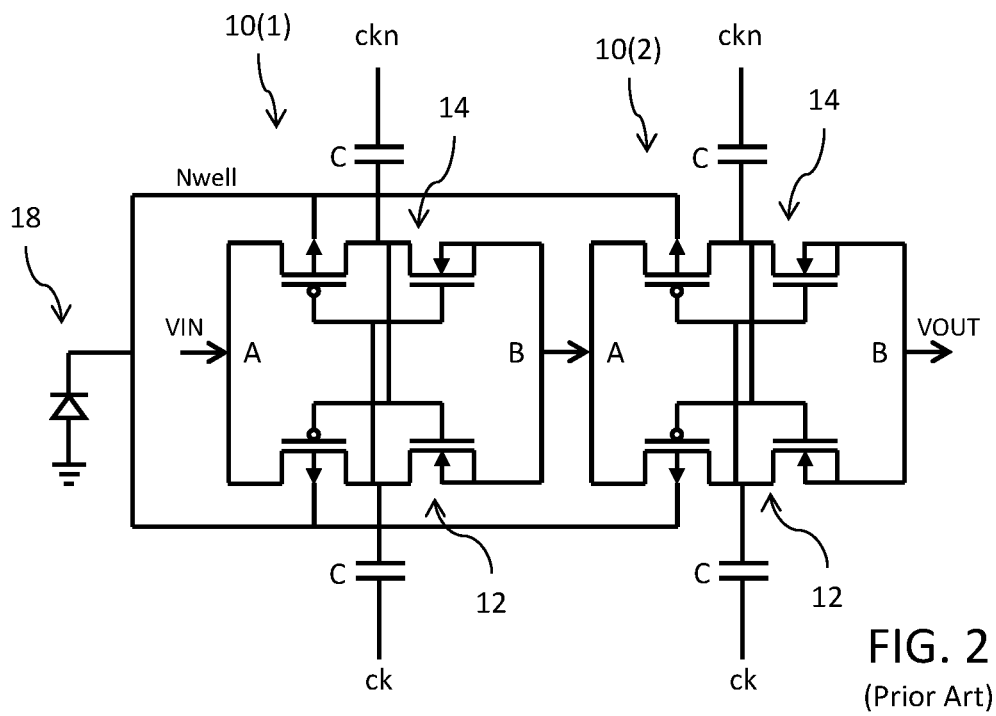
FIG. 2 is a circuit diagram of a charge pump circuit using cascaded stages as shown in FIG. 1.
Figure 3:
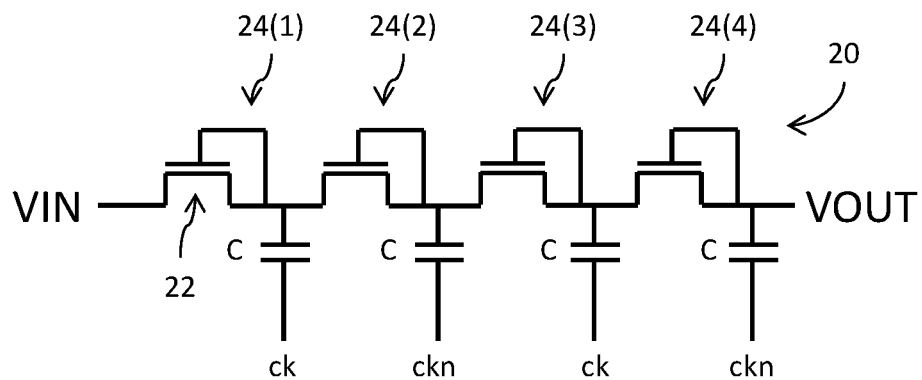
FIG. 3 is a circuit diagram of a prior art negative voltage charge pump circuit.
Figure 3:
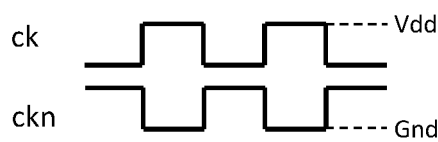
Figure 4:
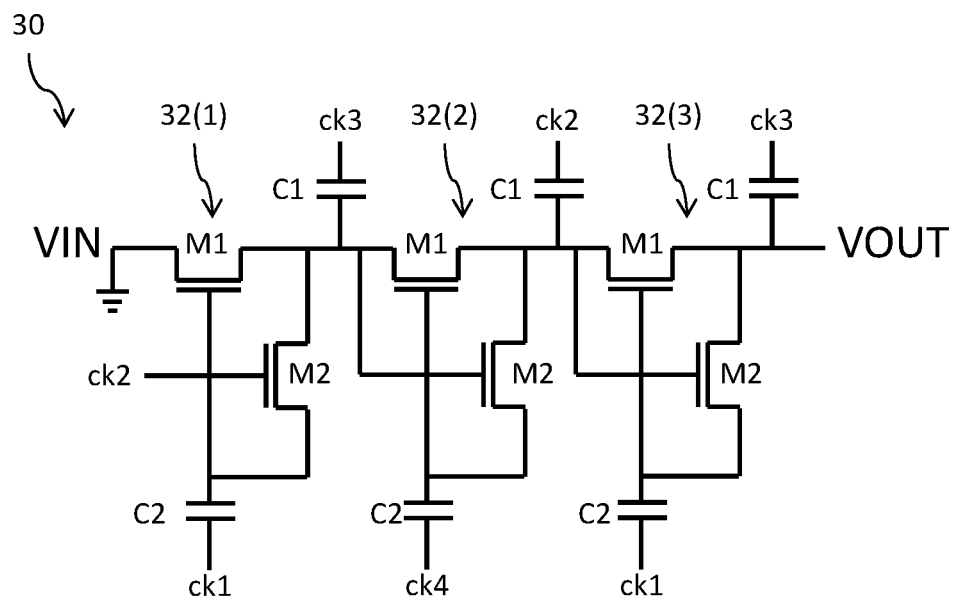
FIG. 4 is a circuit diagram of a prior art negative voltage charge pump circuit.
Figure 4:
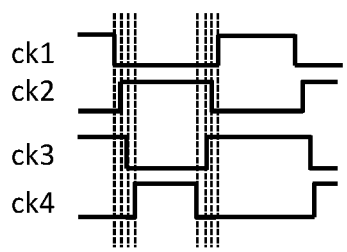

The circuit 100 of FIG. 5, and as implemented in the cascade configuration as shown in FIG. 7, presents a number of advantages over the known solutions shown in FIGS. 1, 3 and 4. For example, the circuit 100, 200 does not suffer with the reliability issues known with the circuit 10 of FIG. 1. Also, the circuit 100, 200 does not have a threshold voltage drop adversely affecting conversion efficiency as experienced with the circuit 20 of FIG. 3. Furthermore, the circuit 100, 200 has a lower output impedance in comparison to the circuit 30 of FIG. 4, and thus has a better current driving capability. An additional advantage of the circuit 110, 200 over prior art solutions is that the n-channel MOS transistors MN1-MN6 can all be implemented as "low voltage" devices with better transconductance performance because the clock signals are all only in the Vdd voltage domain. As a result, the circuit 100, 200 can use transistors which occupy a smaller surface area and consume a lower amount of power. Still further, the generation of all clock signals in the Vdd voltage domain presents a simpler clocking circuit than is used in some prior art solutions where clock signals in multiple different voltage domains are required. The circuit 100, 200 accordingly provides a same negative voltage generation performance with a better efficiency and a smaller circuit area.

Figure 9:
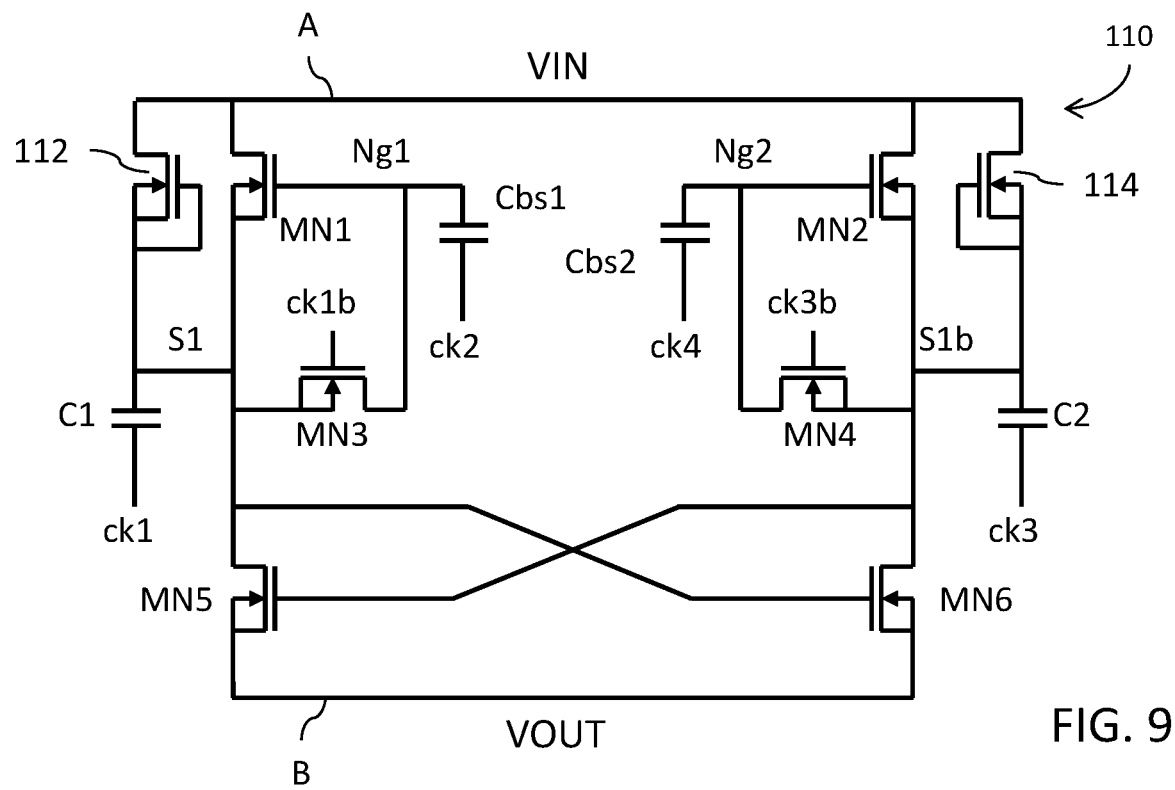
FIG. 9 is a circuit diagram of another embodiment of a negative voltage charge pump circuit.

Reference is now made to FIG. 9 which shows a circuit diagram of another embodiment of a negative voltage charge pump circuit 110. Like references in FIGS. 5 and 9 refer to same or similar circuit components. The circuit 110 of FIG. 9 differs from the circuit 100 of FIG. 5 in the addition of two diodes 112 and 114 coupled, preferably directly connected, between the input node VIN and nodes S1 and S1b, respectively. More specifically, the anode terminals of diodes 112 and 114 are coupled, preferably directly connected, to the input node VIN, the cathode terminal of diode 112 is coupled, preferably directly connected, to the node S1, and the cathode terminal of diode 114 is coupled, preferably directly connected, to the node S1b. In a preferred construction of the circuit 110, the diodes are provided as diode-connected MOS transistors. The diodes 112 and 114 function to mitigate concerns with bulk (body) current which will flow during different transitions of the clock phase signals.

Operation of the circuit 110 is same as described above with respect to the circuit 100 of FIG. 5.

To generate a higher magnitude negative voltage, a plurality of the charge pump circuit stages 110 can be coupled in series in a manner analogous to that shown for circuit 100 in FIG. 7.

Figure 10:
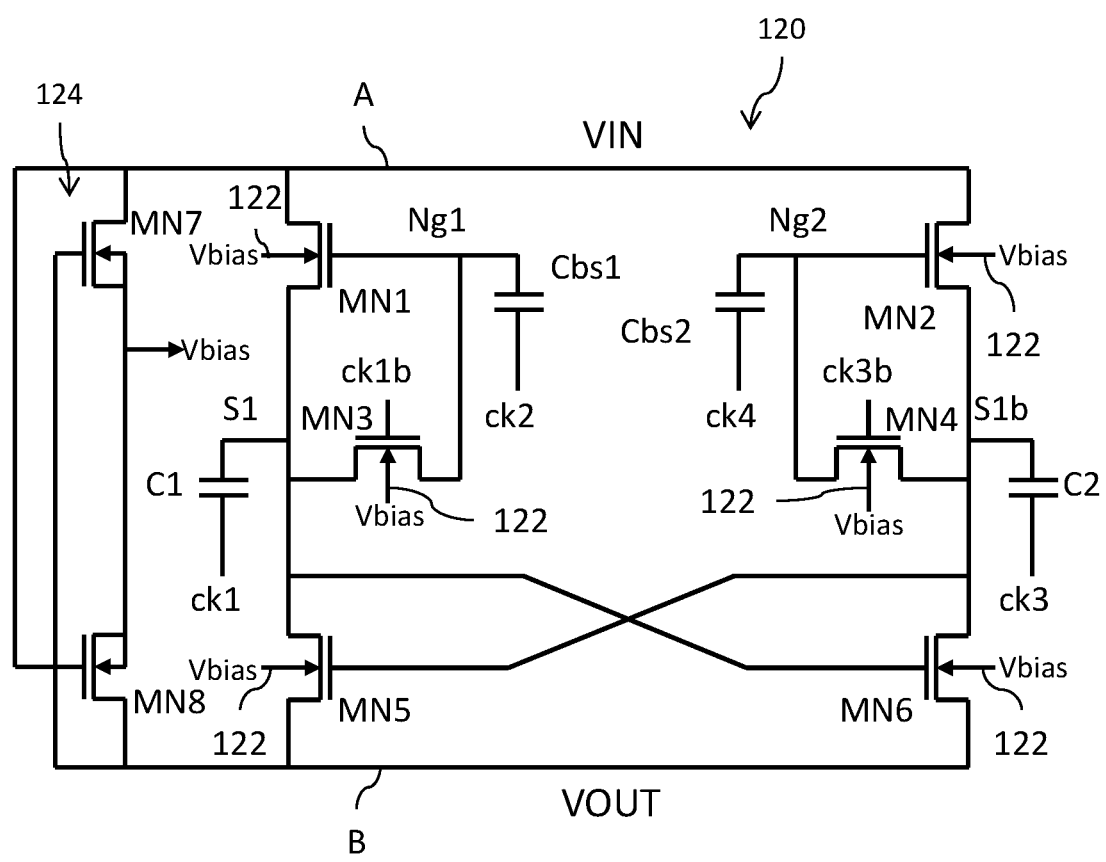
FIG. 10 is a circuit diagram of a further embodiment of a negative voltage charge pump circuit.

Reference is now made to FIG. 10 which shows a circuit diagram of another embodiment of a negative voltage charge pump circuit 120. Like references in FIGS. 5 and 10 refer to same or similar circuit components. The circuit 120 of FIG. 10 differs from the circuit 100 of FIG. 5 in that each of the n-channel transistors MN1-MN6 for the circuit 120 are formed to share a common bulk (body) 122. A further difference is that the source terminals of the n-channel MOS transistors MN1-MN6 are not tied to the common bulk 122. The common bulk 122 is not, however, a floating node. Yet another difference is that the circuit 120 further includes a circuit 124 to bias the common bulk 122.

The bias circuit 124 is formed by a pair of n-channel MOS transistors MN7 and MN8 whose source-drain paths are connected in series between node A and node B. More specifically, the drain of transistor MN7 is connected to node A and the drain of transistor MN8 is connected to node B. The sources of transistors MN7 and MN8 are connected to each other and output the bulk bias voltage Vbias that is applied to the common bulk 122. The gate of transistor MN7 is connected to the drain of transistor MN8 at node B and the gate of transistor MN8 is connected to the drain of transistor MN7 at node A. The transistors MN7 and MN8 thus have a cross-coupled circuit configuration.

The bulk bias voltage Vbias is the minimum voltage available in the circuit 120 at any given time. This bulk bias voltage Vbias is used to bias the bulk 122 of all NMOS transistors which we would like to be at minimum voltage. This implementation helps in reducing the area of circuit 120 because the common bulk (body) configuration enables fabrication of the NMOS transistors in a single PWELL.

Although not specifically illustrated, the circuit 120 of FIG. 10 may further include the diodes 112 and 114 as shown in the circuit 110 of FIG. 9.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A circuit, comprising a plurality of charge pump stages connected in series,
wherein each charge pump stage comprises:
a first transistor having a source-drain path coupled between a stage input node and a first node, said stage input node configured to receive a first voltage;
a second transistor having a source-drain path coupled between the first node and a stage output node, said stage output node configured to generate a second voltage that is more negative than the first voltage;
a third transistor having a source-drain path coupled between the first node and a first control terminal of the first transistor;
a first boost capacitor having a first plate coupled to the first node and a second plate coupled to receive a first clock signal;
wherein a logical inversion of the first clock signal is applied to a third control terminal of the third transistor;
a first bootstrap capacitor having a first plate coupled to the first control terminal and a second plate coupled to receive a second clock signal; and
wherein the first and second clock signals have a same frequency but different duty cycles; and
wherein the second voltage at the stage output node of one charge pump stage in said plurality of charge pump stages is the first voltage for the stage input node of a subsequent connected in series charge pump stage in said plurality of charge pump stages.

2. The circuit of claim 1, wherein the duty cycle of the second clock signal is smaller than the duty cycle of the first clock signal.

3. The circuit of claim 1, wherein each charge pump stage further comprises:
a fourth transistor having a source-drain path coupled between the stage input node and a second node;
a fifth transistor having a source-drain path coupled between the second node and the stage output node;
a sixth transistor having a source-drain path coupled between the second node and a fourth control terminal of the fourth transistor;
a second boost capacitor having a first plate coupled to the second node and a second plate coupled to receive a third clock signal;
wherein a logical inversion of the third clock signal is applied to a sixth control terminal of the sixth transistor;
a second bootstrap capacitor having a first plate coupled to the third control terminal and a second plate coupled to receive a fourth clock signal; and
wherein the third and fourth clock signals have a same frequency but different duty cycles.

4. The circuit of claim 3, wherein the duty cycle of the fourth clock signal is smaller than the duty cycle of the third clock signal.

5. The circuit of claim 3, wherein the third clock signal is 180 degrees out of phase from the first clock signal.

6. The circuit of claim 3, wherein the first and fourth clock signals are non-overlapping.

7. The circuit of claim 3, wherein the second and third clock signals are non-overlapping.

8. The circuit of claim 3, further comprising:
a first diode coupled between the stage input node and the first node; and
a second diode coupled between the stage input node and the second node.

9. The circuit of claim 8, wherein the first and second diodes are each formed by a diode-connected transistor.

10. The circuit of claim 3, wherein the first, second, third, fourth, fifth and sixth transistors share a common bulk (body).

11. The circuit of claim 10, further comprising a bias circuit configured to generate a bias voltage applied to the common bulk (body) of the first, second, third, fourth, fifth and sixth transistors.

12. The circuit of claim 11, wherein the bias circuit comprises:
a seventh transistor having a source-drain path coupled between the stage input node and a third node;
an eighth transistor having a source-drain path coupled between the stage output node and the third node;
wherein a seventh control terminal of the seventh transistor is coupled to the stage output node; and
wherein an eighth control terminal of the eighth transistor is coupled the stage input node.

13. The circuit of claim 3:
wherein a second control terminal of the second transistor is coupled to the second node; and
wherein a fifth control terminal of the fifth transistor is coupled to the first node.

14. The circuit of claim 3, wherein the first, second, third, fourth, fifth and sixth transistors are all n-channel MOS transistors.

15. The circuit of claim 1, further comprising a diode coupled between the stage input node and the first node.

16. The circuit of claim 15, wherein the diode is formed by a diode-connected transistor.

17. The circuit of claim 1, wherein the first, second and third transistors share a common bulk (body).

18. The circuit of claim 17, further comprising a bias circuit configured to generate a bias voltage applied to the common bulk (body) of the first, second and third transistors.

19. The circuit of claim 18, wherein the bias circuit comprises:
a seventh transistor having a source-drain path coupled between the stage input node and a third node;
an eighth transistor having a source-drain path coupled between the stage output node and the third node;
wherein a seventh control terminal of the seventh transistor is coupled to the stage output node; and
wherein an eighth control terminal of the eighth transistor is coupled the stage input node.

20. The circuit of claim 1, wherein the first, second and third transistors are all n-channel MOS transistors.

21. A circuit, comprising a plurality of charge pump stages connected in series,
wherein each charge pump stage comprises:
a first input transistor having a source-drain path coupled between a stage input node and a first node, said stage input node configured to receive a first voltage;
a second input transistor having a source-drain path coupled between the stage input node and a second node;
a first boost capacitor having a first plate coupled to the first node and a second plate coupled to receive a first clock signal;
a first bootstrapping circuit coupled between the first node and a first control terminal of the first input transistor, said first bootstrapping circuit controlled by a logical inversion of the first clock signal and a second clock signal, wherein the first and second clock signals have a same frequency but different duty cycles;
a second boost capacitor having a first plate coupled to the second node and a second plate coupled to receive a third clock signal; and
a second bootstrapping circuit coupled between the second node and a second control terminal of the second input transistor, said second bootstrapping circuit controlled by a logical inversion of the third clock signal and a fourth clock signal, wherein the third and fourth clock signals have a same frequency but different duty cycles;
a first output transistor having a source-drain path coupled between a stage output node and the first node, said stage output node configured to generate a second voltage that is more negative than the first voltage; and
a second output transistor having a source-drain path coupled between the stage output node and the second node;
wherein a control terminal of the first output transistor is coupled to the second node and a control terminal of the second output transistor is coupled to the first node; and
wherein the second voltage at the stage output node of one charge pump stage in said plurality of charge pump stages is the first voltage for the stage input node of a subsequent connected in series charge pump stage in said plurality of charge pump stages.

22. The circuit of claim 21, wherein the first bootstrapping circuit comprises:
a first bootstrapping transistor having a source-drain path coupled between the first node and the first control terminal of the first input transistor, wherein a control terminal of the first bootstrapping transistor is coupled to receive the logical inversion of the first clock signal; and
a first bootstrap capacitor having a first plate coupled to the first control terminal of the first input transistor and a second plate coupled to receive the second clock signal.

23. The circuit of claim 22, wherein the second bootstrapping circuit comprises:
a second bootstrapping transistor having a source-drain path coupled between the second node and the second control terminal of the second input transistor, wherein a control terminal of the second bootstrapping transistor is coupled to receive the logical inversion of the third clock signal; and
a second bootstrap capacitor having a first plate coupled to the second control terminal of the second input transistor and a second plate coupled to receive the fourth clock signal.

24. The circuit of claim 21, wherein the duty cycle of the second clock signal is smaller than the duty cycle of the first clock signal, and wherein the duty cycle of the fourth clock signal is smaller than the duty cycle of the third clock signal.

25. The circuit of claim 21, wherein the first and fourth clock signals are non-overlapping, and wherein the second and third clock signals are non-overlapping.

26. The circuit of claim 21, wherein the third clock signal is 180 degrees out of phase from the first clock signal.

27. The circuit of claim 21, further comprising:
a first diode coupled between the stage input node and the first node; and a second diode coupled between the stage input node and the second node.

28. The circuit of claim 27, wherein the first and second diodes are each formed by a diode-connected transistor.

29. The circuit of claim 21, wherein the first and second input transistors share a common bulk (body).

30. The circuit of claim 29, further comprising a bias circuit configured to generate a bias voltage applied to the common bulk (body) of the first and second input transistors.

31. The circuit of claim 30, wherein the bias circuit comprises:
  a first bias transistor having a source-drain path coupled between the stage input node and a third node;
  a second bias transistor having a source-drain path coupled between the stage output node and the third node;
  wherein a control terminal of the first bias transistor is coupled to the stage output node; and
  wherein a control terminal of the second bias transistor is coupled the stage input node.

* * * * *